United States Patent
Inoue

(10) Patent No.: US 8,553,133 B2
(45) Date of Patent: Oct. 8, 2013

(54) FOCUSING APPARATUS

(75) Inventor: Koji Inoue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 12/852,560

(22) Filed: Aug. 9, 2010

(65) Prior Publication Data

US 2011/0050981 A1 Mar. 3, 2011

(30) Foreign Application Priority Data

Aug. 26, 2009 (JP) ................................. 2009-194905

(51) Int. Cl.
*H04N 5/232* (2006.01)

(52) U.S. Cl.
USPC ........................................................ 348/345

(58) Field of Classification Search
USPC .................... 348/345, 349, 350, 353, 354; 396/79–83, 89–152; 250/201.4, 201.6, 250/201.7; 352/139, 140; 359/696, 698; 382/255
See application file for complete search history.

(56) References Cited

U.S. PATENT DOCUMENTS

| | | | | | |
|---|---|---|---|---|---|
| 5,749,000 | A | * | 5/1998 | Narisawa | 396/121 |
| 2008/0317453 | A1 | * | 12/2008 | Yuyama | 396/104 |
| 2009/0074395 | A1 | * | 3/2009 | Terayama | 396/123 |

FOREIGN PATENT DOCUMENTS

| | | |
|---|---|---|
| JP | 05-005933 A | 1/1993 |
| JP | 2001-174690 | 6/2001 |
| JP | 2005-227639 | 8/2005 |
| JP | 2006-227080 A | 8/2006 |
| JP | 2007-304280 A | 11/2007 |
| JP | 2009-037263 A | 2/2009 |

OTHER PUBLICATIONS

The above references were cited in a Jan. 22, 2013 Japanese Office Action, which is enclosed without an English Translation, that issued in Japanese Patent Application No. 2009-194905.

* cited by examiner

*Primary Examiner* — Tuan Ho
*Assistant Examiner* — Angel L Garces-Rivera
(74) *Attorney, Agent, or Firm* — Cowan, Liebowitz & Latman, P.C.

(57) ABSTRACT

A focusing apparatus includes a setting unit configured to set a focus detection area to be focused among a plurality of focus detection areas, a memory configured to store focus correction information based on a focusing status of a focus lens in each of the focus detection area to be focused and another focus detection area, a focus detection unit configured to detect the focusing status of the focus lens in the other focus detection areas, and a focusing unit configured to move the focus lens for focusing based on the focusing status of the focus lens detected in the other focus detection area. The focusing unit corrects the focusing status of the focus lens detected in the other focus detection area based on the focus correction information stored in the memory and achieves focusing.

6 Claims, 4 Drawing Sheets

FOCUSING APPARATUS

BACKGROUND OF THE INVENTION

1. Field of the Invention

The present invention relates to a focusing apparatus.

2. Description of the Related Art

Japanese Patent Laid-Open No. ("JP") 2001-174690 discloses an image pickup apparatus configured to enable a user to freely correct an adjustment value that is set at the factory shipping time so as to calibrate a defocus amount of an image pickup optical system. JP 2005-227639 discloses a focusing apparatus configured to provide a fine adjustment to autofocus ("AF") for each lens (AF micro adjustment).

In taking an image with a focus on a human face, the face does not necessarily have a high contrast and thus the focus may not be accurately and stably detected. In taking an image of an object (e.g. a runner) in a certain composition, a face of the object is located on the periphery and it is difficult, particularly when the object is a moving body, to continuously focus a focus detection area (or a focus detection frame) on the periphery of the screen on the object.

SUMMARY OF THE INVENTION

A focusing apparatus according to one aspect of the present invention includes a setting unit configured to set a focus detection area to be focused among a plurality of focus detection areas, a memory configured to store focus correction information based on a focusing status of a focus lens in each of the focus detection area to be focused and another focus detection area, a focus detection unit configured to detect the focusing status of the focus lens in the other focus detection areas, and a focusing unit configured to move the focus lens for focusing based on the focusing status of the focus lens detected in the other focus detection area, wherein the focusing unit corrects the focusing status of the focus lens detected in the other focus detection area based on the focus correction information stored in the memory and achieves focusing.

Further features of the present invention will become apparent from the following description of exemplary embodiments with reference to the attached drawings.

DESCRIPTION OF THE EMBODIMENTS

Figure 1:
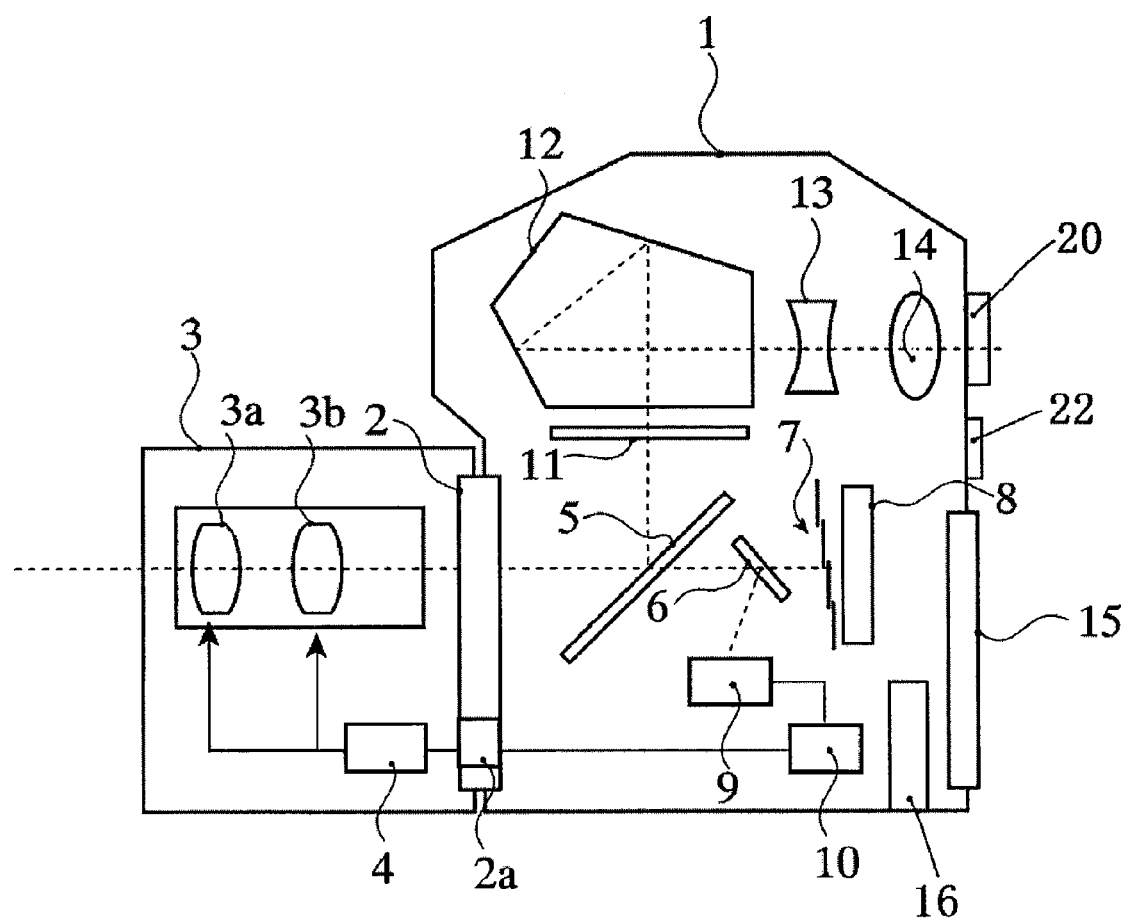
FIG. 1 represents a block diagram of an image pickup apparatus to which the present invention is applicable.

FIG. 1 represents a block diagram of an image pickup apparatus (digital single-lens reflex camera) to which the present invention is applicable. Reference numeral 1 denotes a camera body, reference numeral 2 denotes a mount configured to attach an image pickup lens (image pickup optical system) 3 and to detach it from the camera body 1, and the mount 2 includes a mount connection 2a as an interface part used to communicate various types of signals or to supply a driving power.

The image pickup lens 3 is an exchangeable lens, and includes a focus lens unit 3a and a zoom lens unit 3b. Each lens unit is represented by a single lens for convenience. When all lenses or a part of lens are moved, each lens unit can change a focal length or provide focusing. Reference numeral 4 denotes a lens controller configured to control an operation of the entire image pickup lens 3, and the lens controller 4 includes a CPU.

Reference numeral 5 denotes a main mirror, configured to rotate according to an operating state of the camera. The main mirror 5 is inserted into an image pickup optical path to deflect a light flux from the image pickup lens 3 toward a finder optical system in observing the object with the finder, and is retracted from the image pickup optical path to introduce the light flux from the image pickup lens 3 to an image pickup element 8 at the exposure time.

Reference numeral 6 denotes a sub-mirror (half-mirror) configured to rotate with the main mirror 5, and to deflect a light flux which has passed through the main mirror 5 to a focus detection apparatus 9 when the main mirror 5 is obliquely disposed in the image pickup optical path. Reference numeral 7 denotes a shutter. An image pickup device 8 includes a CCD or a CMOS configured to form an object image by photoelectric-converting an object image formed by the image pickup lens 2. The focus may be detected according to a phase difference detection method by embedding a focus detecting pixel into a part of the image pickup device 8.

The focus detection apparatus (focus detector) 9 outputs a signal used for a determination of an in-focus position, includes an area sensor (line sensor) (not illustrated), and is configured to detect a focusing status of the image pickup lens 3 for each focus detection area by using the phase difference detection method. More specifically, the focus detection apparatus 9 condenses light from the object, separates it into two light fluxes by a separator lens (which is a distance-measuring optical system different from the image pickup lens 3), and forms images of the two light fluxes on two different photoelectric conversion element rows. As an object distance changes, a distance changes between the object images generated from the two light fluxes. Each photoelectric conversion element row accumulates electric charges for a time period defined by the object brightness, an output from the photoelectric conversion element row is quantized by an AD converter after the charges are accumulated, and a quantized signal is detected in a correlation operator. Due to this correlation operation, a shift amount is calculated between two signals in a unit of a pixel. The focus detection apparatus 9 is configured to measure an object distance in an optical axis direction based on a shift amount, a distance between the two photoelectric conversion element rows, and a focal length of the distance-measuring optical system by using a triangulation method, and to output it to a camera controller 10. In other words, the focus detection apparatus 9 functions as a distance information obtaining unit configured to obtain distance information on a distance between each focus detection area and the object.

The camera controller 10 controls operations of the entire camera body 1. In addition, the camera controller 10 functions as a focusing unit configured to correct a focus detection result of an apparent focus detection area described below by a difference of an object distance between an apparent focus detection area and a real focus detection area, and to provide such focusing that the real focus detection area can focused. Furthermore, the camera controller 10 functions as a phase difference in-focus determination unit configured to perform the phase difference focus detection by using an output signal from the focus detection apparatus 9, and to determine whether or not the focus lens of the image pickup lens 3 is located within an in-focus range. Moreover, the camera controller 10 functions as a contrast in-focus determination unit configured to detect the contrast of a photoelectrically converted image (taken image) by using an output signal from the image pickup element 8, and to determine whether or not the focus lens in the image pickup lens 3 is located on the in-focus position. The camera controller 10 includes a CPU (controller), a ROM or RAM which functions as or a memory, a timer configured to measure a set period.

Reference numeral 11 denotes a focus plate disposed on a primary imaging surface of the image pickup lens 3, and includes a Fresnel lens (condenser lens) on a light incident surface and an object image (finder image) on a light exit surface.

Reference numeral 12 denotes a pentaprism configured to change a finder optical path, and to correct to an upright image an object image formed on the light exit surface of the focus plate 11. Reference numerals 13, 14 denote eyepiece lenses. The focus plate 11, the pentaprism 12, and the eyepiece lens 13, 14 constitute the finder optical system. Reference numeral 15 denotes a liquid crystal monitor (display) configured to display a taken image. Reference numeral 16 denotes a recording medium as a memory.

Reference numeral 20 denotes a finder configured to display an object image to be taken and a plurality of focus detection areas on an image-taking screen at once. Reference numeral 22 denotes a setting unit configured to set an apparent focus detection area and a real focus detection area in the plurality of focus detection areas displayed on the finder 20. The apparent focus detection area is a focus detection area used for the focus detection by the focus detection area 9. The real focus detection area is a focus detection area that is really to be focused and not used for the focus detection by the focus detection apparatus 9. The setting unit 22 may include a dial, a switch, a pointing device, and another input unit.

Figure 2:
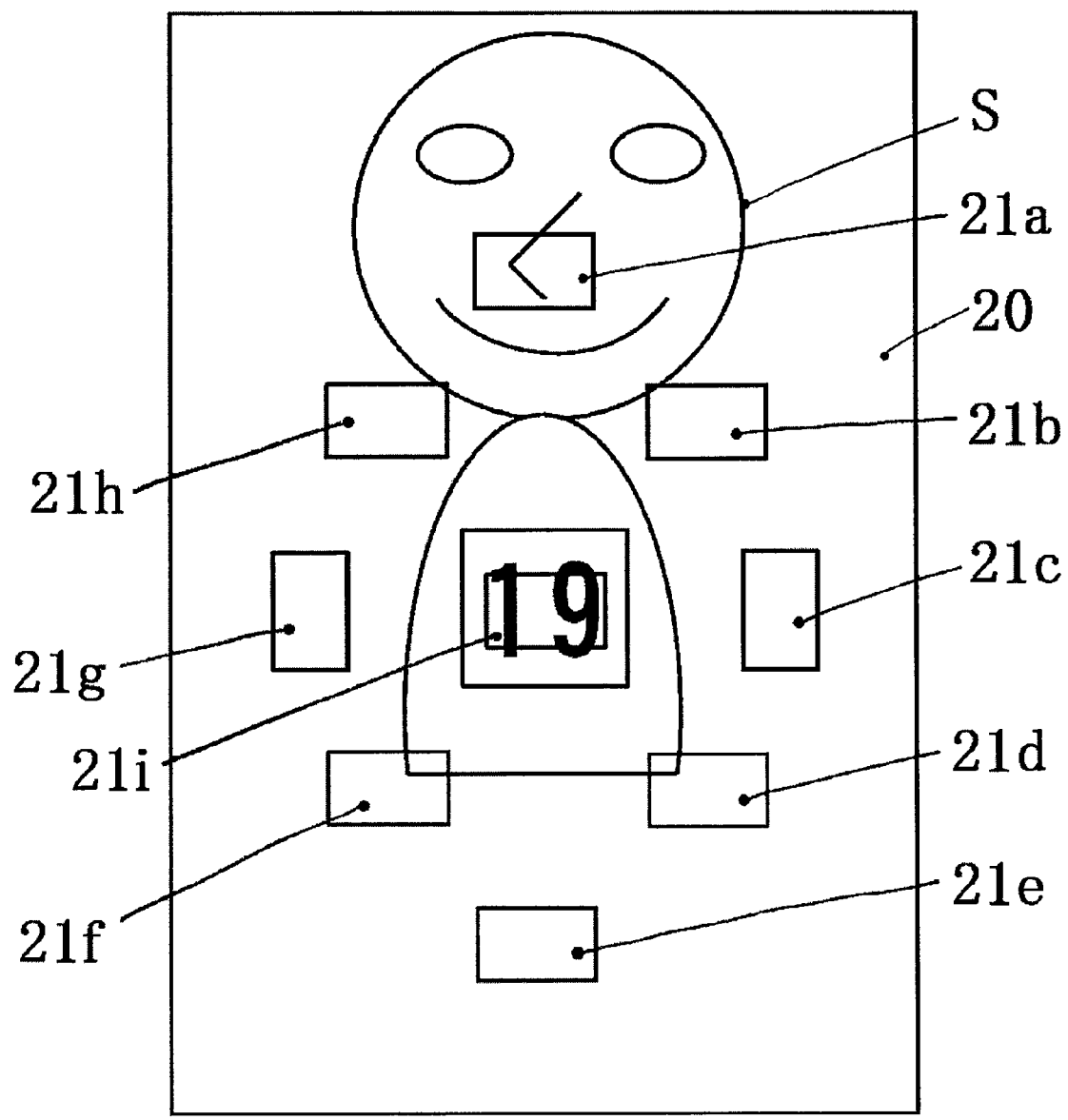
FIG. 2 represents an image-taking screen of a finder in the image pickup apparatus represented in FIG. 1.

FIG. 2 represents an image-taking screen of the finder 20, and an object S is, for example, an athlete runner having a number cloth 19. In photographing the runner, focusing on his face is important but difficult because the face of the runner has a low contrast, is located at the periphery of the screen, and is moving.

First Embodiment

Figure 3:
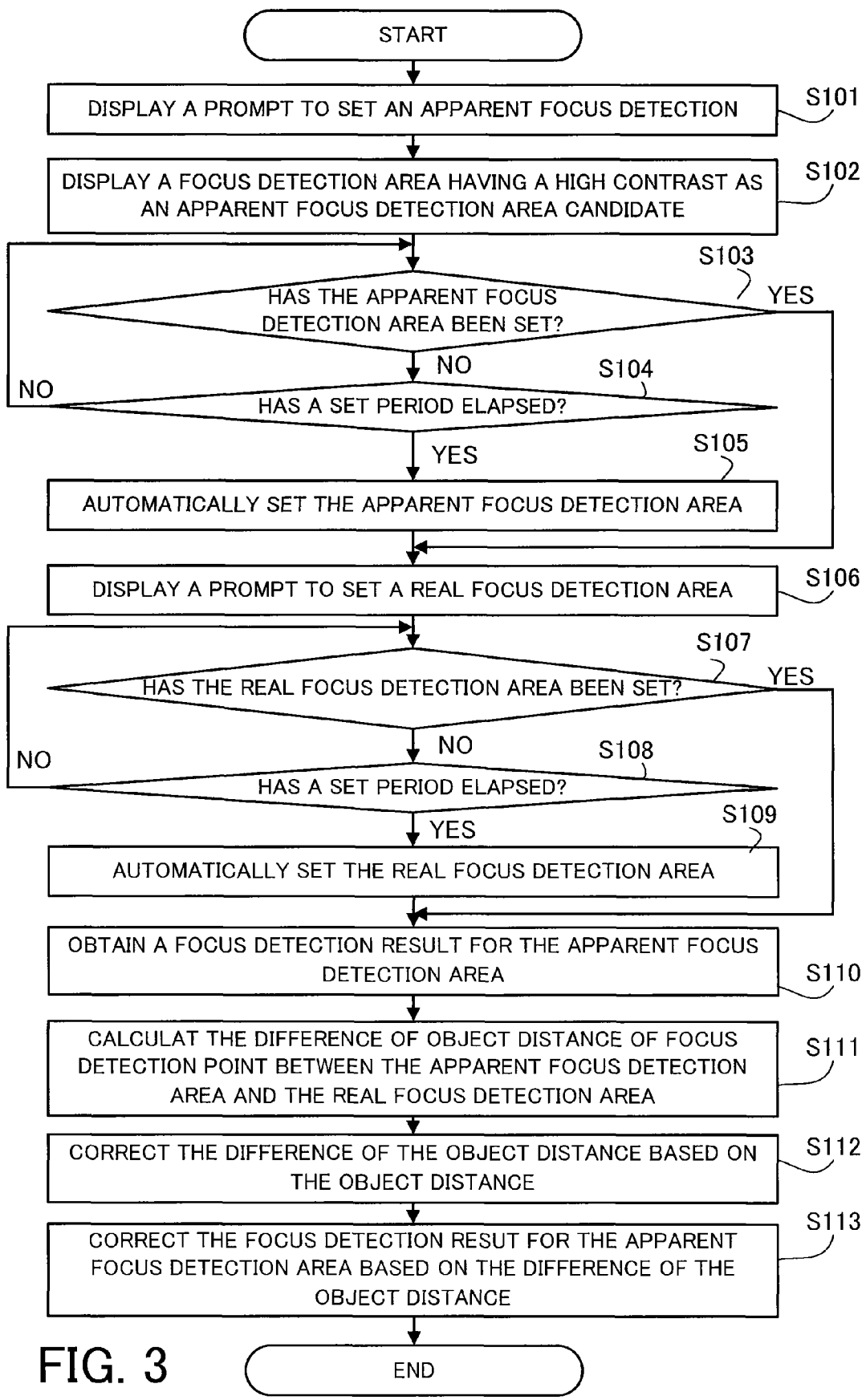
FIG. 3 represents a flow chart that illustrates an AF operation of a camera controller in the image pickup apparatus represented in FIG. 1 according to a first embodiment.

Referring now to FIGS. 2 and 3, a description will be given of an AF operation of the camera controller 10 according to the first embodiment. FIG. 3 represents a flow chart that illustrates the AF operation of the camera controller 10 according to first embodiment, and S stands for a step. When the object is located in the finder 20, the flow represented in FIG. 3 is executed.

In this state, as illustrated in FIG. 2, the object S and a plurality of focus detection areas 21a-21i are displayed on the image-taking screen of the finder 20 at once. An arrangement of the plurality of focus detection areas 21a-21i represented in FIG. 2 is mere exemplification. Therefore, an arrangement of the plurality of focus detection areas of the present invention is not limited to that represented in FIG. 2, and may be different, such as a matrix state.

The camera controller 10 may display the information of the plurality of focus detection areas 21a-21i by using a focus detector in a contrast method or by using a focus detector in a phase difference method using a plurality of line sensors (not illustrated). Alternatively, a focus detector in a phase difference method using a focus detecting pixel included in a part of the image pickup elements 8 may be used. Each of these focus detectors can detect the focusing status of the image pickup lens 3.

Initially, the camera controller 10 displays a sign for prompting a photographer to set an apparent focus detection area in the finder 20 (S101). In general, the apparent focus detection area can more stably obtain a AF result with higher AF accuracy than the real focus detection area in the composition viewed from the finder 20, and is located at the center with a small motion of the object. In this embodiment, the apparent focus detection area and the real focus detection area are different from each other.

The camera controller 10 displays an apparent focus detection area candidate by changing a color of the focus detection area having a high contrast or by blinking it in displaying the prompt to set the apparent focus detection area (S102).

Next, the camera controller 10 determines whether the photographer has set the apparent focus detection area via the setting unit 22 (S103). When no apparent focus detection area is input within a set period which the timer (not illustrated) measures ("NO" in S103, "YES" in S104), the camera controller 10 automatically sets the apparent focus detection area (S105). In this case, the camera controller 10 sets the apparent focus detection area to, for example, a focus detection area which corresponds to a center of the composition or which has the highest contrast. Moreover, when the object is a human, the apparent focus detection area may be set to a body position expected from a face position. The flow returns to S103 within the set period, and moves to S106 when the apparent focus detection area is set in S103.

Assume that the photographer has set the focus detection area 21i to the apparent focus detection area in S103 in this embodiment. Setting of the focus detection area 21i of the center of the composition to a position of the number cloth 19 which has a high contrast can provide a stable result with a high AF accuracy.

Next, the camera controller 10 displays a prompt to set the real focus detection area in the finder 20 (S106). In photographing a human, in general, the real focus detection area is an area including a part of a human face.

Next, the camera controller 10 determines whether the photographer sets the real focus detection area via the setting unit 22 (S107). When no real focus detection area is not input within a set period which the timer (not illustrated) measures ("NO" in S107, "YES" in S108), the camera controller 10 automatically sets the real focus detection. The flow returns to S107 within the set period, and moves to S110 when the real focus detection area is set in S107.

Assume that the photographer has set the focus detection area 21a corresponding to the face of the object S to the real focus detection area in S107 in this embodiment.

Next, the camera controller 10 obtains a focus detection result for the apparent focus detection area (or the focus detection area 21i) from the focus detection apparatus 9 and/or the image pickup element 8 (S110). The focus is more stably detected with higher accuracy by using the focus detection area 21i having a high contrast than a focus detection with the focus detection area 21a having a low contrast by tracking the object or the runner. The focus detection result obtained in S110 is stored in the memory of the camera controller 10. In this embodiment, since S110 uses a detection result of the focus detection apparatus 9, the camera controller 10 can also obtain an object distance of each of the apparent focus detection area and the real focus detection area.

Next, the camera controller 10 calculates a difference (of an object distance) or a distance from the camera to the object between the apparent focus detection area 21i and the real focus detection area 21a (S111). As described above, the focus detection 9 notifies the object distance to the camera controller 10, but the lens controller 4 of the image pickup lens 3 may have this function. Each object distance or the difference of the object distance obtained in S110 is stored in the memory of the camera controller 10.

The difference of the object distance is sufficiently small on a focal plane when the object is distant, but its influence increases as the object approaches. Hence, a mere difference makes difficult to convert the apparent focus detection area into the real focus detection area. Accordingly, the camera controller 10 corrects the difference of the object distance calculated in S111 based on the distance information on the distance from the apparent focus detection area which the focus detection apparatus 9 has obtained in S110, to the object (S112).

In this case, the memory of the camera controller 10 previously stores a relationship between the object distance and the correction amount. According to this relationship, the correction amount is small when the object distance is small, and the correction amount increases as the object distance is large. This relationship is not a linear relationship in a whole range of the object distance. For example, the correction amount may be constant when the object distance falls within a constant range and then linearly increase when the object distance falls within a larger range, or the correction amount may curvilinearly increase over the whole range of the object distance.

In S112, the camera controller 10 can correct the difference of the object distance based on the information of the object distance obtained by the focus detection apparatus 9, and achieve such focusing based on the corrected difference of the object distance that the real focus detection area can be focused.

Next, the camera controller 10 corrects the focus detection result for the apparent focus detection area obtained in S110 based on the distance of the object distance obtained in S111 or the difference of the object distance corrected in S113 (S113). As a result, this embodiment can correct a difference of a defocus amount between the focus detection area 21*i* corresponding to the number cloth and the focus detection area 21*a* corresponding to the face, and can precisely and stably obtain the focus detection result of the real focus detection area 21*a*.

Then, the camera controller 10 moves the focus lens based on a result obtained in S114 for such focusing that the real focus detection area 21*a* can focused, and subsequently takes an image.

Second Embodiment

Figure 4:
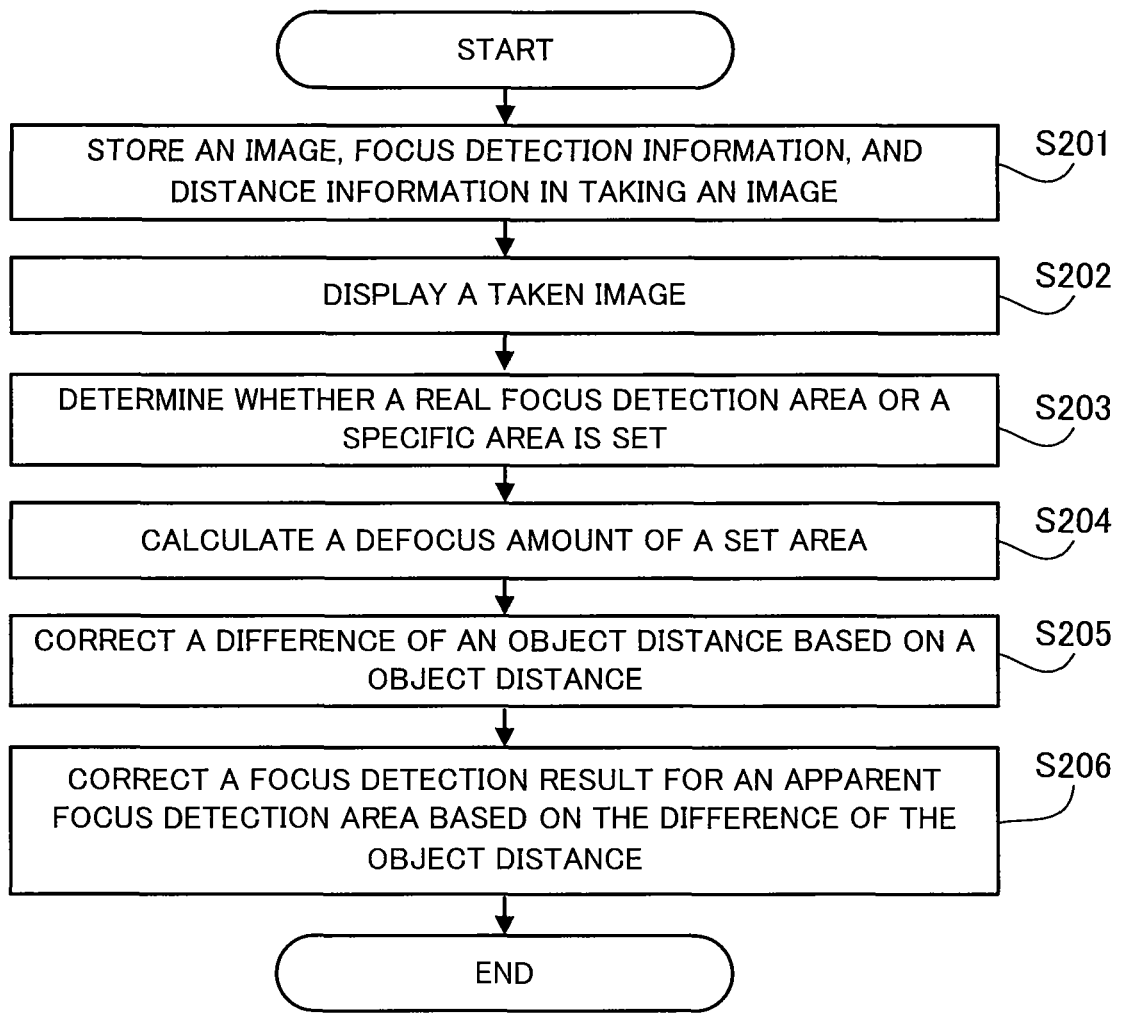
FIG. 4 represents a flow chart that illustrates an AF operation of a camera controller in the image pickup apparatus represented in FIG. 1 according to a second embodiment.

Referring now to FIG. 4, a description will be given of an AF operation using the camera controller according to a second embodiment. The second embodiment also uses an image pickup apparatus similar to FIG. 1. FIG. 4 represents a flow chart that illustrates an AF operation of a camera controller 10 according to the second embodiment, and S stands for a step. This embodiment utilizes a focus detecting pixel that is arranged on a part of the image pickup device 8, but may use another focus detector.

Initially, the camera controller 10 stores a taken image, focus detection information of a focus detection area, and distance information in the memory or memory medium 16 at the same time (S201). Assume that this image pickup is performed with the apparent focus detection area. The distance information may be information of an object distance or information of a difference of an object distance between the apparent focus detection area and another position.

Next, the camera controller 10 reproduces and displays the taken image stored in the memory on the liquid crystal monitor 15'(S202).

Next, the camera controller 10 determines whether or not a photographer has set the real focus detection area (specific area) in the image-taking screen displayed on the liquid crystal monitor 15 (S203). The photographer specifies, for example, areas that encloses a face (or a part of the face) of the object S in FIG. 2 by using the setting unit 22. As described above, the focus detection apparatus 9 functions as a distance information obtaining unit configured to obtain distance information from the specific area to the object.

Next, the camera controller 10 calculates the defocus amount set in S203 by using the recorded focus detecting pixel (S204).

Next, the camera controller 10 corrects the defocus amount calculated in S204 by the difference of the object distance (S206). The difference of the object distance may be corrected similar to S112 (S205). In other words, the camera controller 10 utilizes the distance information detected by the focus detection apparatus 9 to correct the difference of the object distance between one of the plurality of focus detection areas used for the photography of the stored image-taking screen and a specific area set by the setting unit 22. The camera controller 10 corrects a focusing status of the one focus detection area based on the corrected difference of the object distance.

Each of FIGS. 3 and 4 is implemented as a program which the CPU can execute.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-194905, filed Aug. 26, 2009 which is hereby incorporated by reference herein in its entirety.

What is claimed is:

1. A focusing apparatus comprising:
a setting unit configured to set a first focus detection area to be focused among a plurality of focus detection areas;
a memory configured to store focus correction information based on a focusing status of a focus lens in each of the first focus detection area and a second focus detection area that is different from the first focus detection area;
a focus detection unit configured to detect the focusing status of the focus lens in the second focus detection area; and
a focusing unit configured to move the focus lens for focusing based on the focusing status of the focus lens detected in the second focus detection area,
wherein the focusing unit corrects a difference between an object distance of the first focus detection area and an object distance of the second focus detection area in accordance with the focus correction information stored in the memory and the focusing status of the second focus detection area detected in the focus detection unit, corrects the focusing status of the second focus detection area detected in the focus detection unit based on the corrected difference between the object distance of the first focus detection area and the object distance of the second focus detection area so as to focus the first focus detection area, and moves the focus lens based on the corrected focusing status of the second focus detection area.

2. The focusing apparatus according to claim 1, wherein the focusing status is information on an object distance from the focusing apparatus to an object.

3. The focusing apparatus according to claim 1, wherein the focus detection unit detects the focusing status of the focus lens based on an output signal from a focus detecting pixel included in a part of an image pickup device configured to obtain an image signal.

4. The focusing apparatus according to claim 2, wherein the memory stores, as the focus correction information, information of the object distance in each of the first focus detection area and the second focus detection area.

5. The focusing apparatus according to claim 2, wherein the memory stores, as the focus correction information, a difference between an object distance for the first focus detection area and an object distance for the second focus detection area.

6. The focusing apparatus according to claim 1, further comprising a finder configured to display an image of an object to be taken via a focus lens and the plurality of the focus detection areas in an image-taking screen, wherein the setting unit sets the first focus detection area based on an instruction from a photographer.

* * * * *